(12) United States Patent
Costabel

(10) Patent No.: US 10,670,069 B2
(45) Date of Patent: Jun. 2, 2020

(54) CLIP BODY, CLIP, AND FASTENING ARRANGEMENT

(71) Applicant: SFS intec Holding AG, Heerbrugg (CH)

(72) Inventor: Sascha Costabel, Herrenberg (DE)

(73) Assignee: SFS intec Holding AG, Heerbrugg (CH)

(*) Notice: Subject to any disclaimer, the term of this patent is extended or adjusted under 35 U.S.C. 154(b) by 142 days.

(21) Appl. No.: 15/736,500

(22) PCT Filed: Jul. 5, 2016

(86) PCT No.: PCT/EP2016/065767
§ 371 (c)(1),
(2) Date: Dec. 14, 2017

(87) PCT Pub. No.: WO2017/016815
PCT Pub. Date: Feb. 2, 2017

(65) Prior Publication Data
US 2018/0180086 A1    Jun. 28, 2018

(30) Foreign Application Priority Data
Jul. 24, 2015  (DE) .......................... 10 2015 009 643

(51) Int. Cl.
*F16B 37/04*    (2006.01)
*F16B 5/06*    (2006.01)
(Continued)

(52) U.S. Cl.
CPC .......... *F16B 37/043* (2013.01); *F16B 5/0635* (2013.01); *F16B 37/044* (2013.01);
(Continued)

(58) Field of Classification Search
CPC .... F16B 5/0635; F16B 21/073; F16B 37/043; F16B 37/044; F16B 37/0857; F16B 37/04; Y10S 411/97
(Continued)

(56) References Cited

U.S. PATENT DOCUMENTS 2,198,439 A    4/1940  Kost
2,250,072 A    7/1941  Tinnerman
(Continued)

FOREIGN PATENT DOCUMENTS

DE    202006014151    2/2008
DE    102013018113    3/2015
DE    102014000231    7/2015

OTHER PUBLICATIONS http://www.shur-lok.eu/ (Year: 2019)—Shur-Lok Website Front Page.*

*Primary Examiner* — Roberta S Delisle
(74) *Attorney, Agent, or Firm* — Volpe and Koenig, P.C.

(57) ABSTRACT

The invention relates to a clip body (10) with a retainer (12) for a fastening device (14), wherein the clip body (10) can be fastened to a panel (18) provided with at least one fastening opening (16), wherein the clip body (10) has two limbs, of which one can be arranged on a first side of the panel (18) and the other can be arranged on a second side of the panel (18), and for this purpose is placed onto an edge of the panel (18), and the clip body (10) has at least one positioning element (20). According to the invention, the at least one positioning element (20) can be guided through the fastening opening (16) in the panel (18), and the clip body (10) can be positioned on the panel (18) by a stop of the at least one positioning element (20) on an edge (22) of the fastening opening (16). The invention also relates to a clip (30) and a fastening arrangement (50).

13 Claims, 9 Drawing Sheets

(51) Int. Cl.
*F16B 37/08* (2006.01)
*F16B 21/07* (2006.01)

(52) U.S. Cl.
CPC ............. *F16B 21/073* (2013.01); *F16B 37/04* (2013.01); *F16B 37/0857* (2013.01)

(58) Field of Classification Search
USPC .......................... 411/172–174, 175, 190–191
See application file for complete search history.

(56) References Cited

U.S. PATENT DOCUMENTS

| | | | | |
|---|---|---|---|---|
| 2,657,443 | A | | 11/1953 | Hartman |
| 3,118,480 | A | * | 1/1964 | Kreider ................. F16B 37/041 |
| | | | | 411/173 |
| 4,074,491 | A | * | 2/1978 | Bell .......................... B64C 1/06 |
| | | | | 411/116 |
| 4,219,064 | A | * | 8/1980 | Lozano ................. F16B 37/041 |
| | | | | 411/103 |
| 5,599,148 | A | | 2/1997 | Hirose |
| 5,893,694 | A | * | 4/1999 | Wilusz ................. F16B 37/044 |
| | | | | 411/112 |
| 6,287,064 | B1 | * | 9/2001 | Jhumra ................. F16B 37/043 |
| | | | | 411/112 |
| 6,474,917 | B2 | | 11/2002 | Gauron |
| 6,854,941 | B2 | * | 2/2005 | Csik ....................... F16B 37/044 |
| | | | | 411/111 |
| 6,918,725 | B2 | | 7/2005 | Gauron |
| 7,789,606 | B2 | * | 9/2010 | Kosidlo, IV ............ F16B 37/02 |
| | | | | 411/173 |
| 8,177,466 | B2 | * | 5/2012 | Csik ....................... F16B 37/043 |
| | | | | 411/174 |
| 8,231,317 | B2 | * | 7/2012 | De Gelis ................ F16B 5/0225 |
| | | | | 411/174 |
| 9,816,547 | B2 | | 11/2017 | Costabel et al. |
| 2002/0182027 | A1 | | 12/2002 | Gauron |

* cited by examiner

CLIP BODY, CLIP, AND FASTENING ARRANGEMENT

BACKGROUND

The invention relates to a clip body with a retainer for a fastening device, the clip body being fastenable to a panel provided with at least one fastening opening, the clip body having two limbs, of which one can be arranged on a first side of the panel and the other can be arranged on a second side of the panel, and for this purpose is placed onto an edge of the panel, and the clip body having at least one positioning element. The invention also relates to a clip and a fastening arrangement.

Clips of the type presented are used in particular to connect two parts to each other, for example two panels in the interior of a vehicle or aircraft. To this end, the clip is fitted onto one of the panels, in the region of a fastening opening in the panel. The clip is positioned such that a fastening device of the clip is aligned with the fastening opening in the panel. The panel must then be joined to the other panel to which it is to be fastened and which likewise has a fastening opening, in order then to achieve fastening of the entire fastening arrangement with a mating part complementary to the fastening device of the clip.

Examples of such clips are described in DE 20 2006 014 151 U1, U.S. Pat. No. 6,918,725 B2 and U.S. Pat. No. 6,474,917 B2.

Common to all these clips is that they have two limbs, of which one is arranged on one side of the panel and the other is arranged on the other side of the panel. To this end, the clip is fitted onto an edge of the panel. Axial forces, i.e. forces acting perpendicularly or virtually perpendicularly to the panel, must be absorbed by the spring force of the two limbs connected to each other. Depending on the design of the clip, positioning of the clip must be checked visually by the fitter via the fastening opening. The limb on one side of the panel can bend away when a fastening device is introduced, so that the clip loses its position and connection to the second panel is no longer possible.

U.S. Pat. No. 2,657,443 describes a fastener which can be fitted onto a panel and is designed such that it is retained in the region of openings in the panel by means of retaining lugs.

SUMMARY

An object of the invention is to provide a clip body, a clip and a fastening arrangement with which the problems and disadvantages of the prior art are overcome and which in particular allow reliable and practical positioning of the clip on the panel, while the fastening arrangement is provided with additional stability.

This object is achieved with a clip, a clip body, and a fastening arrangement with one or more features of the invention as described below and in the claims.

The invention relates to a clip body with a retainer for a fastening device, wherein the clip body can be fastened to a panel provided with at least one fastening opening, and wherein the clip body has at least one positioning element, which can be guided through the fastening opening in the panel, and the clip body can be positioned on the panel by means of a stop of the at least one positioning element on an edge of the fastening opening. In particular, the invention builds on the clip body of the type in question in that the at least one positioning element can be guided through the fastening opening in the panel and that the clip body can be positioned on the panel by a stop of the at least one positioning element on an edge of the fastening opening. The positioning element makes it easy for the clip to be correctly positioned over the opening in the panel.

In this connection, it is particularly useful that the positioning element at the same time is or is connected to a locking element, with which the panel can be brought into contact on a side facing away from the retainer. This stabilises the clip body in the axial direction. Whereas clip bodies in the prior art are axially stabilised in the region of the fastening arrangement only when the fastening device is completed, this is different for the present clip body. In the present case, axial stabilisation is already provided from the moment at which the clip body is inserted into the panel. This makes work on the object easier, and additional stability is also provided for the finished fastening arrangement, thanks to the locking element.

Usefully, the locking element has at least one tongue.

It is also possible for the clip body to have at least one reinforcement element. Reinforcement elements, for example ribs, help to give the clip body additional stability, so that it maintains its position on the panel in particular when the fastening device is completed.

Usefully, the clip body is produced from an insulating material and/or from a material which prevents contact corrosion. Since the clip bodies are used to produce a fastening arrangement in different environments, the prevention of corrosion should be ensured under all circumstances. Precisely the regions in which fastening arrangements are provided are subjected to particular mechanical stresses, and therefore weakening as a result of corrosion in these regions is not acceptable, in particular if they are safety-critical regions as are often found in automotive and aerospace engineering.

In this connection, it can be practical for the clip body to consist of plastic.

Furthermore, it is also useful in this connection for at least one sealing element to be attached to the clip body. Sealing elements can also ensure that different sides of the interconnected panels can be separated from each other in a gas-tight and/or liquid-tight manner.

The invention also relates to a clip having a clip body as described above and having a fastening device.

It is usefully provided for the fastening device to be bolt-like.

Particular embodiments of the clip are developed such that
- the fastening device comprises a retaining cam and a pin,
- the fastening device comprises a nut and a screw-fastening,
- the fastening device comprises a spring clip and a pin,
- the fastening device comprises a taper nut and a screw-fastening.

According to a particularly preferred embodiment of the clip according to the invention, the fastening device is held in the retainer with play in at least one direction parallel to the panel. The play of the fastening device in the retainer means that the overall fastening arrangement is given enough tolerance for the clip to be used even for tasks in which a certain tolerance is required from the start.

The invention also relates to a fastening arrangement having a clip as described above and a panel provided with a fastening opening, the panel being arranged in particular in the interior of a vehicle or aircraft.

BRIEF DESCRIPTION OF THE DRAWINGS

The invention is now explained by way of example using particularly preferred embodiments, with reference to the attached drawings.

DETAILED DESCRIPTION OF THE PREFERRED EMBODIMENTS

In the following description of detailed embodiments of the invention, the same reference signs refer to the same or comparable components.

Figure 1:
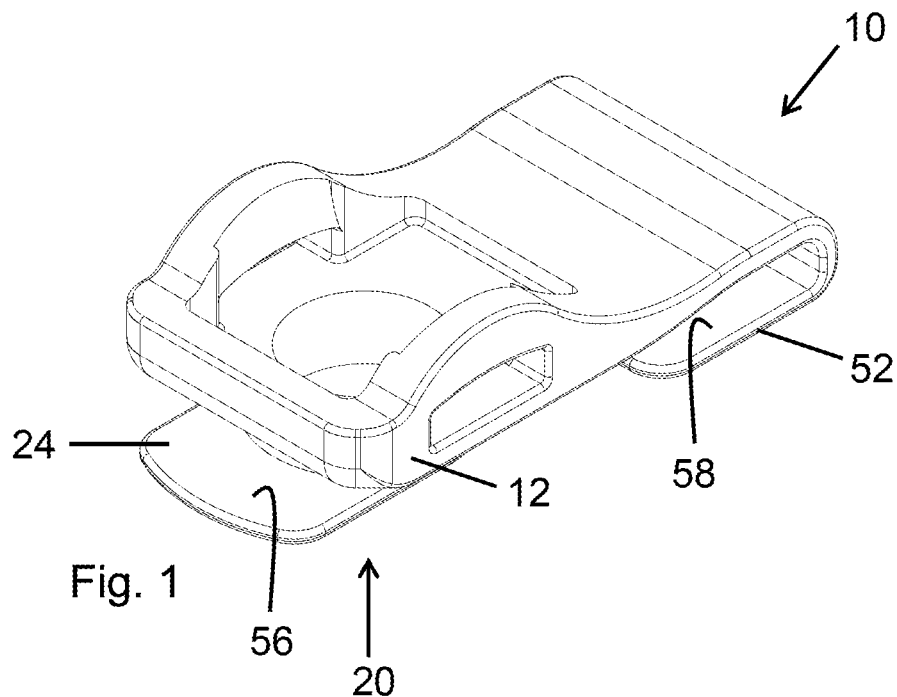
FIG. 1 shows a first perspective diagram of a first embodiment of a clip body.
Figure 2:
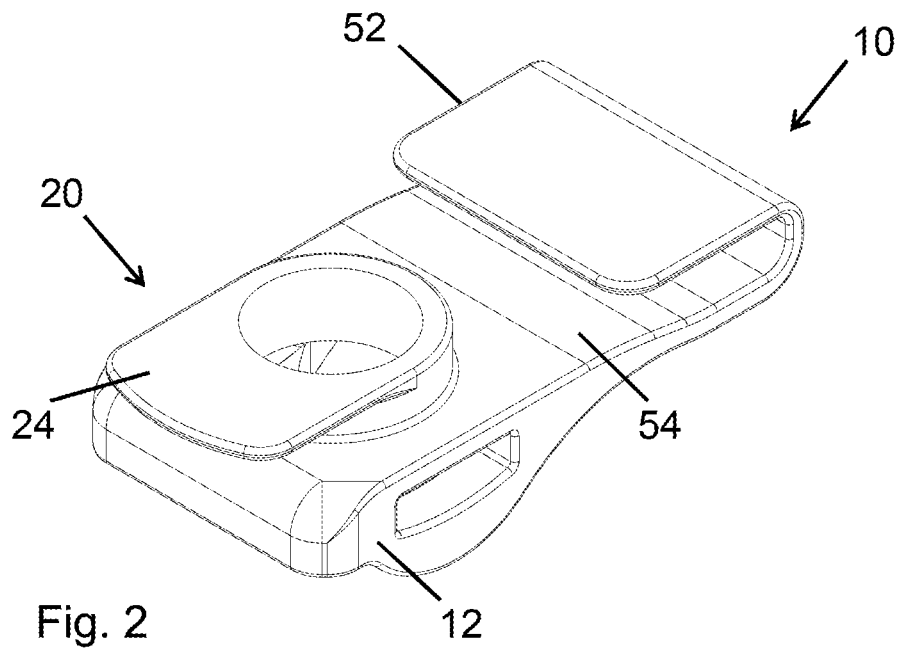
FIG. 2 shows a second perspective diagram of the first embodiment of a clip body.

FIG. 1 shows a first perspective diagram of a first embodiment of a clip body 10. FIG. 2 shows a second perspective diagram of the first embodiment of a clip body 10. The clip body 10 has a retainer 12 for a fastening device (not shown here). Fastening devices of different kinds are shown in FIGS. 7 to 14 and generally provided with the reference sign 14. The clip body 10 also comprises a positioning element 20. The positioning element shown here is suitable for a circular fastening opening. This positioning element 20 helps to position the clip body 10 correctly in the region of a fastening opening in a panel (not shown here). Panels with fastening openings are shown in FIGS. 8, 10, 12, 14 and 15; the panels are generally provided with the reference sign 18 and the fastening openings have reference sign 16 in said figures. The positioning element at the same time is a locking element or is connected to a locking element, which is preferably in the form of a tongue 24. With this tongue 24, the clip body 10 engages under the panel to which it is fastened. To this end, the tongue 24 is pushed through the fastening opening in the panel. The tongue 24 or the positioning element 20 defines a first end region of the clip body. The clip body is provided at a second end region with a retaining lug 52. This is used to fit around an edge region of the panel to which the clip body 10 is fastened. In the present exemplary embodiment, the clip body thus has three contact regions 54, 56, 58 for the panel. The first contact region 54 makes contact with the panel on the side facing the retainer 12. This contact region 54 is a lower face of the clip body 10, if the clip body is fastened with the retainer on the upper face of a panel. A further contact region 56 is defined by the upper face of the tongue 24. Yet another contact region 58 is defined by the upper face of the retaining lug 52. In the present example, the contact regions 56, 58 of the tongue 24 and the retaining lug 52 lie in one plane. This is practical if the panel is flat and has the same thickness in the edge region as in the surroundings of the fastening opening. If the panel thickness varies, however, the contact regions 56, 58 of the tongue 24 and the retaining lug 52 lie in different planes.

Figure 3:
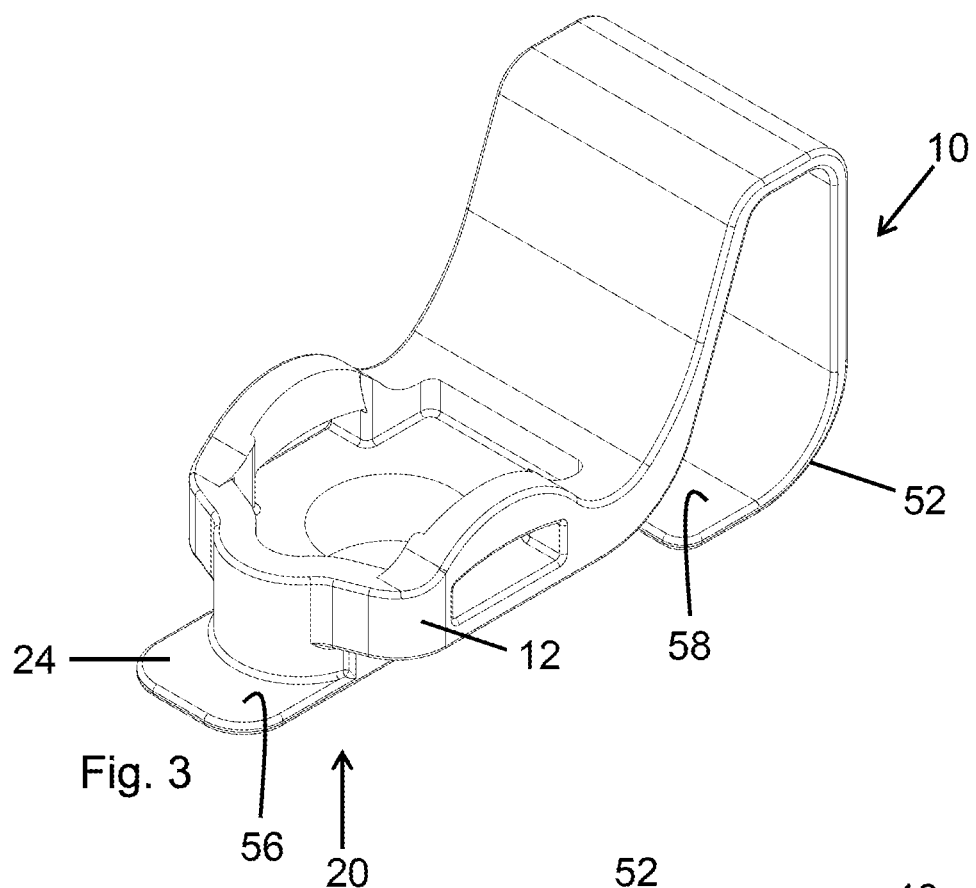
FIG. 3 shows a first perspective diagram of a second embodiment of a clip body.
Figure 4:
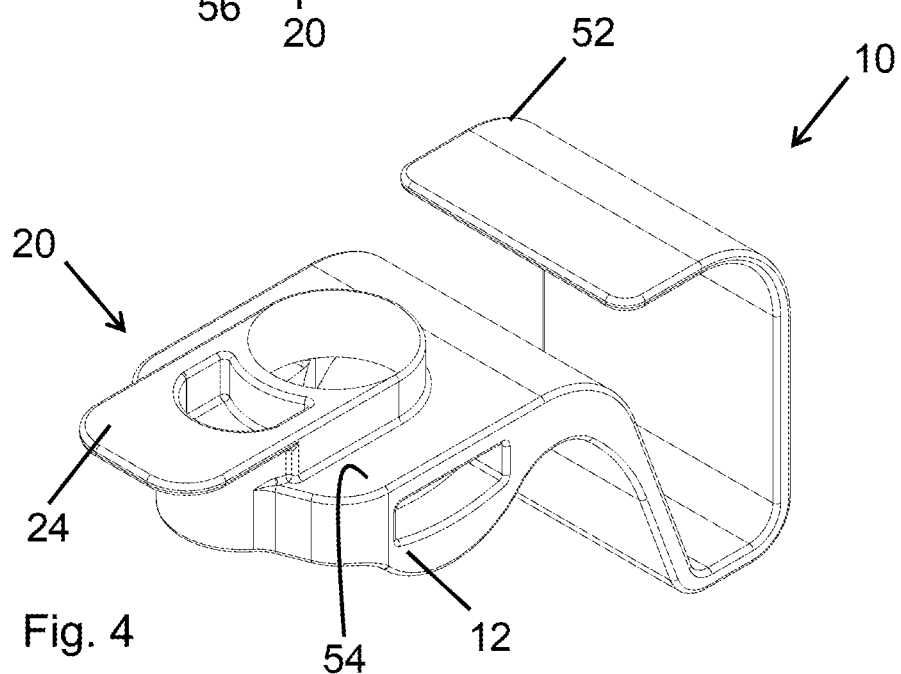
FIG. 4 shows a second perspective diagram of a second embodiment of a clip body.

FIG. 3 shows a first perspective diagram of a second embodiment of a clip body 10. FIG. 4 shows a second perspective diagram of a second embodiment of a clip body 10. The embodiment of a clip body 10 presented here differs from that of FIGS. 1 and 2 by a different design of the positioning element 20 and a different design of the retaining lug 52. The contact region 54 of the clip body 10 above the panel is designed differently in the region of the positioning element 20. The positioning element shown here is suitable for a slot-like fastening opening. The retaining lug 52 is designed such that it can fit around a panel with a bent edge and provides the most secure retention possible here.

Figure 5:
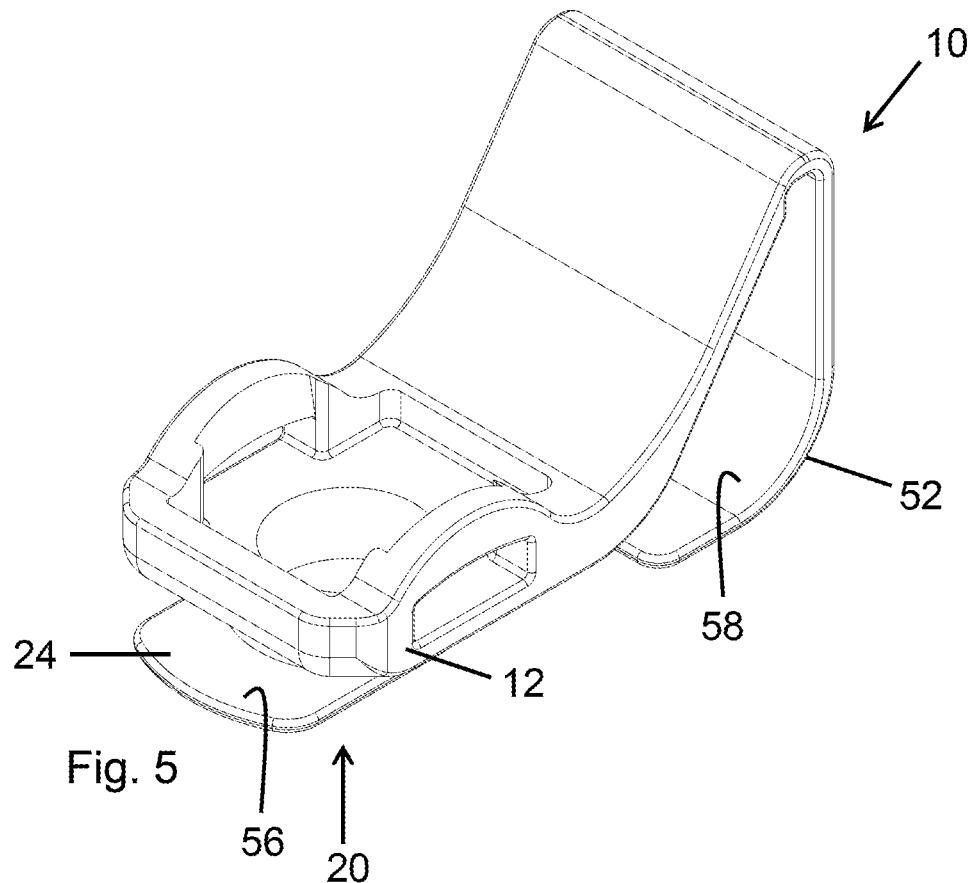
FIG. 5 shows a first perspective diagram of a third embodiment of a clip body.
Figure 6:
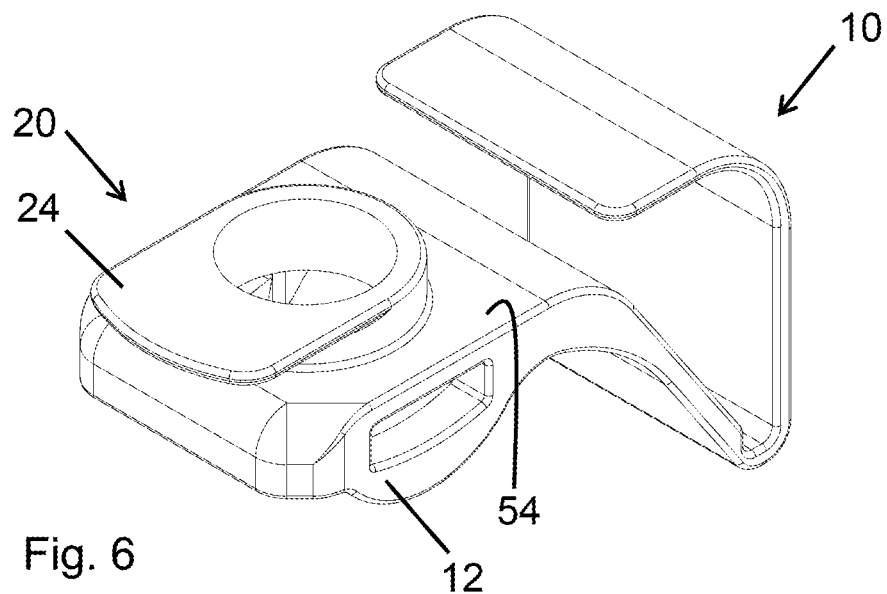
FIG. 6 shows a second perspective diagram of a third embodiment of a clip body.

FIG. 5 shows a first perspective diagram of a third embodiment of a clip body 10. FIG. 6 shows a second perspective diagram of a third embodiment of a clip body 10. In this embodiment, the positioning element 20 is designed similarly to that of the embodiment according to FIGS. 1 and 2 but the retaining region 52 is designed differently to provide the clip body with better retention on edge regions, also differently shaped, of a panel.

Figure 7:
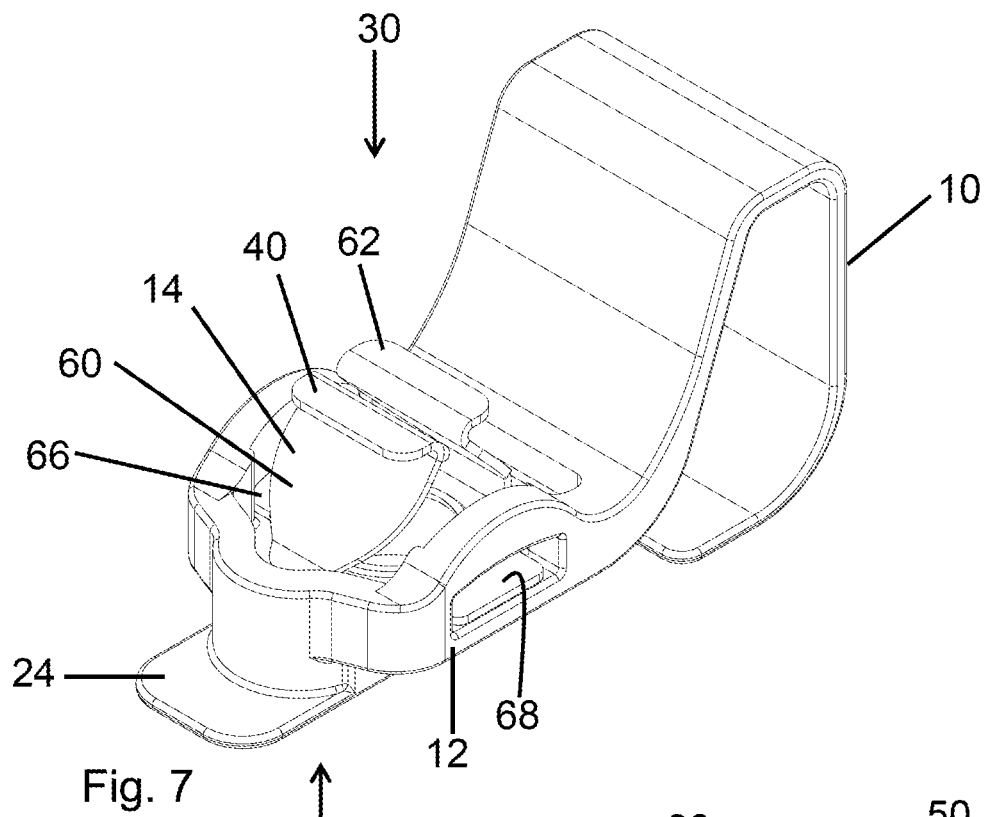
FIG. 7 shows a perspective diagram of a first embodiment of a clip.
Figure 8:
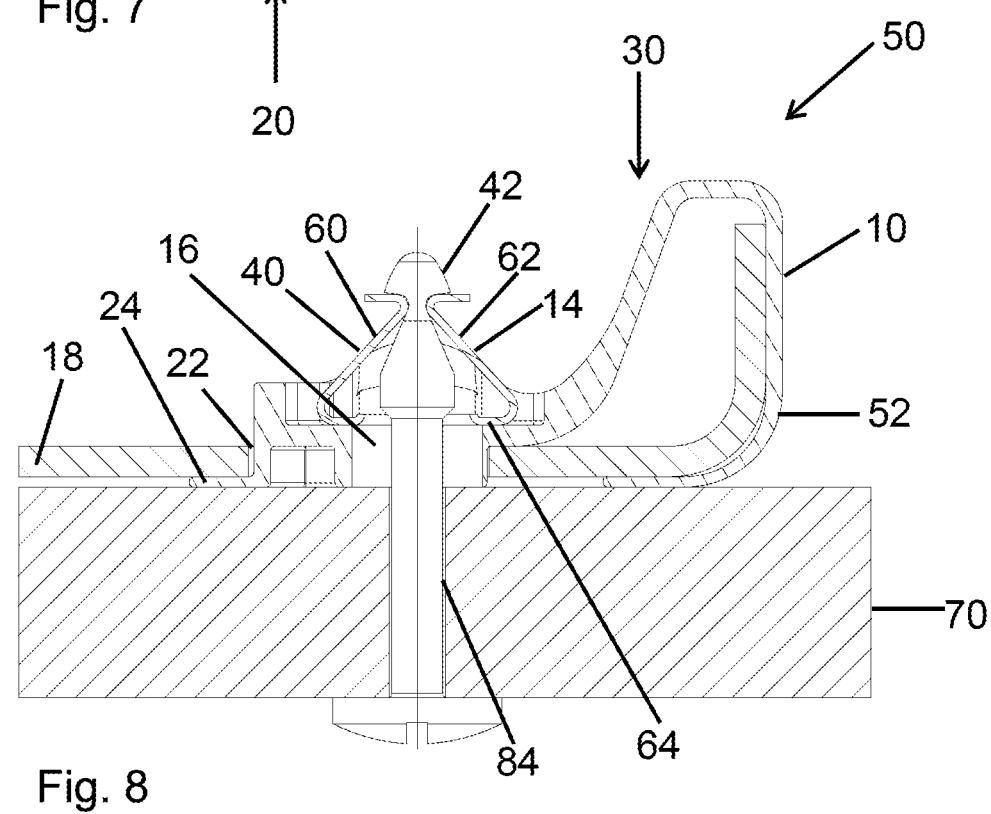
FIG. 8 shows a section through a fastening arrangement having a clip according to FIG. 7.

FIG. 7 shows a perspective diagram of a first embodiment of a clip 30. FIG. 8 shows a section through a fastening arrangement 50 having a clip 30 according to FIG. 7. Using the example of the clip body 10 according to FIGS. 3 and 4, the completion of the clip body to form the clip 30 and the interaction of the clip with a complete fastening arrangement 50 is explained. The clip body 10 is provided with a fastening device 14, which is in the form of a spring clip 40 in the present case. The spring clip 40 comprises two resilient limbs 60, 62, which are connected via a perforated connecting region 64. On the connecting region 64 are arranged tongues 66, 68, with which the spring clip 40 engages in the retainer 12 of the clip body 10 and is retained on the clip body 10 thereby. Depending on the dimensions of the retainer 12 and the fastening device 14, in particular of the tongues 66, 68 on the fastening device 14, the fastening device 14 is tilted into the retainer, a tongue 66, 68 being introduced into an opening in the retainer 12 first. Then the fastening device 14 is moved such that the connecting region 64 is parallel to the clip body 10. The fastening device 14 reaches its end position by being pushed into a symmetrical position on the clip body 10. In an alternative embodiment, the fastening device 14 can be arranged in the retainer 12 of the clip body 10 by first being introduced into the clip body 10 at a 90° angle to its final position. When the clip body is rotated 90° into the final position, the tongues 66, 68 pass into the openings in the retainer 12 to provide the required retention. Both tongues 66, 68 then lie in the retainer 12. The positioning element 20 then lies on the edge 22 of the fastening opening 16. Although an end position is defined by a symmetrical arrangement of the fastening device 14 in the clip body 10, there is preferably also a certain amount of play, so that the fastening device 14 can be moved to and fro inside the clip body 10. This play should exist at least in one direction parallel to the panel, preferably in all directions parallel to the panel. When the clip is in the mounted state, it engages under the panel 18 by the tongue 24 in the region of the positioning element 20. The retaining lug 52 likewise engages under the panel 18. The arrangement thus produced of panel 18 and clip 30 is placed onto a second panel 70, so that the tongue 24 and the part of the retaining lug 52 engaging under the panel 18 lie between the panels 18, 70. A pin 42 is then guided through the openings 84, 16. A thickened end of said pin forces the limbs 60, 62 of the spring clip apart. The pin 42 has reached its final position when the limbs 60, 62 spring back together and pass into a tapered region below the thickened end of the pin 42. The pin 42 is preferably not rotationally symmetrical in the tapered region below the thickened end but rather has a thickness, in a direction perpendicular to the plane of view in FIG. 8, which corresponds to its thickened end. This makes it possible to remove the pin 42 again from the fastening arrangement. Specifically, when the pin 42 is rotated, it forces the limbs 60, 62 of the spring clip 40 apart again, so that the thickened end of the pin 42 no longer finds purchase in the spring clip 40 and can be pulled out.

Figure 9:
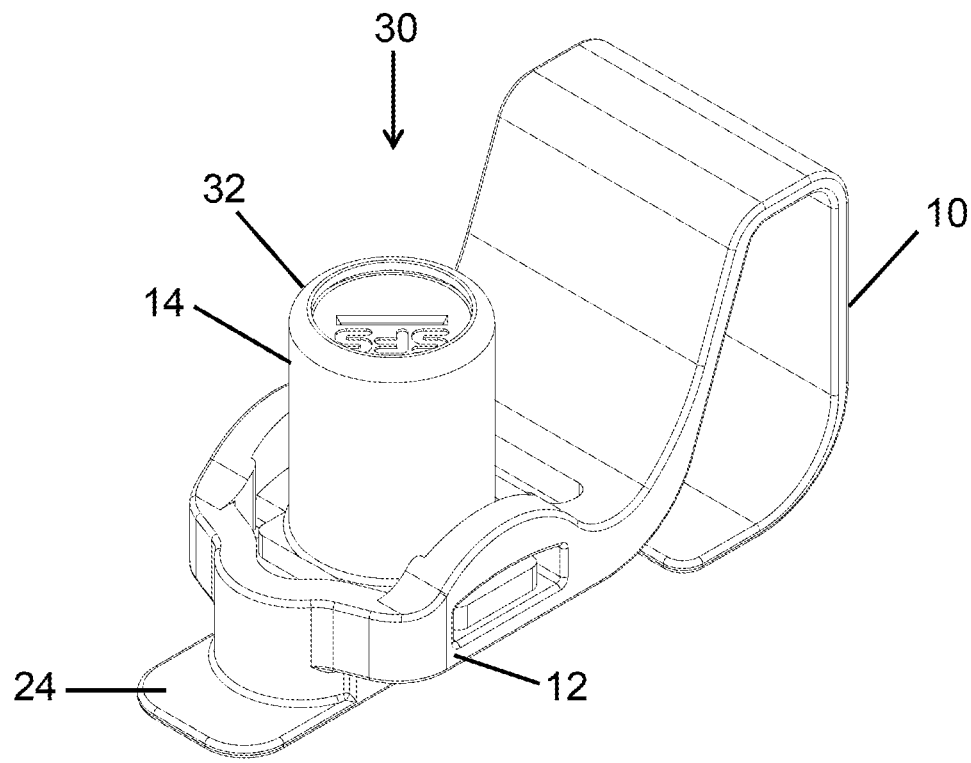
FIG. 9 shows a perspective diagram of a second embodiment of a clip.
Figure 10:
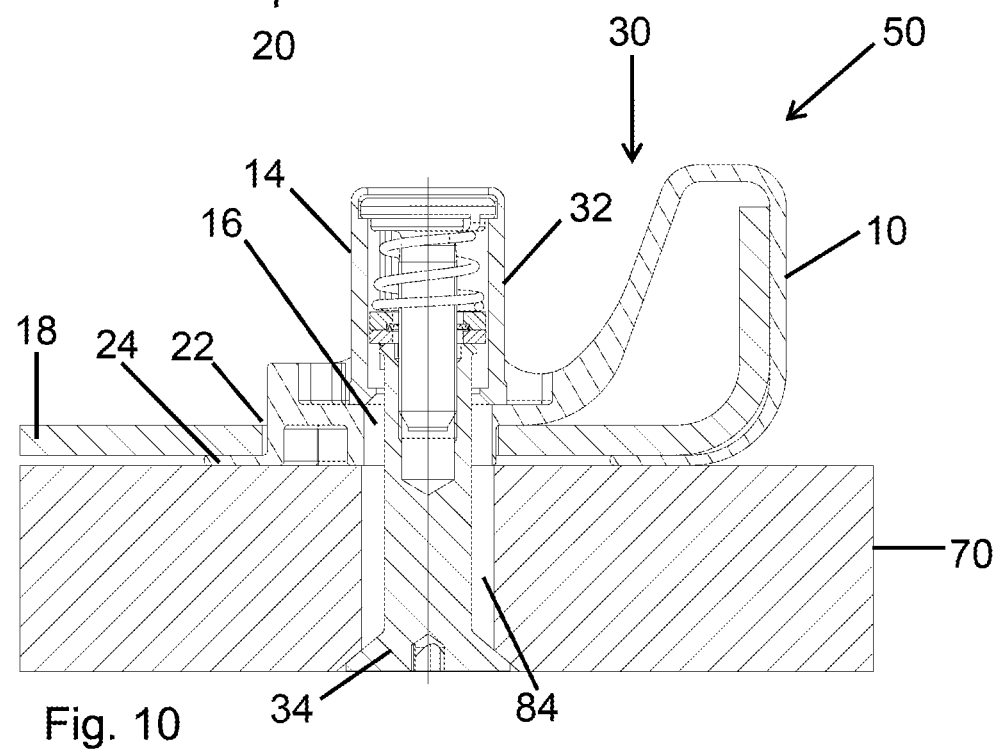
FIG. 10 shows a section through a fastening arrangement having a clip according to FIG. 9.

FIG. 9 shows a perspective diagram of a second embodiment of a clip 30. FIG. 10 shows a section through a fastening arrangement having a clip 30 according to FIG. 9. On the clip body 10, which is identical to that described in connection with FIGS. 7 and 8, is arranged a fastening device 14 of a different type. In this case, it is a retaining cam 32 which can interact with a pin 34. The manner in which this arrangement of retaining cam 32 and pin 34 functions is described in detail in DE 10 2007 959 148 B4, the disclosure of which in this regard is fully included in the content of the present disclosure.

Figure 11:
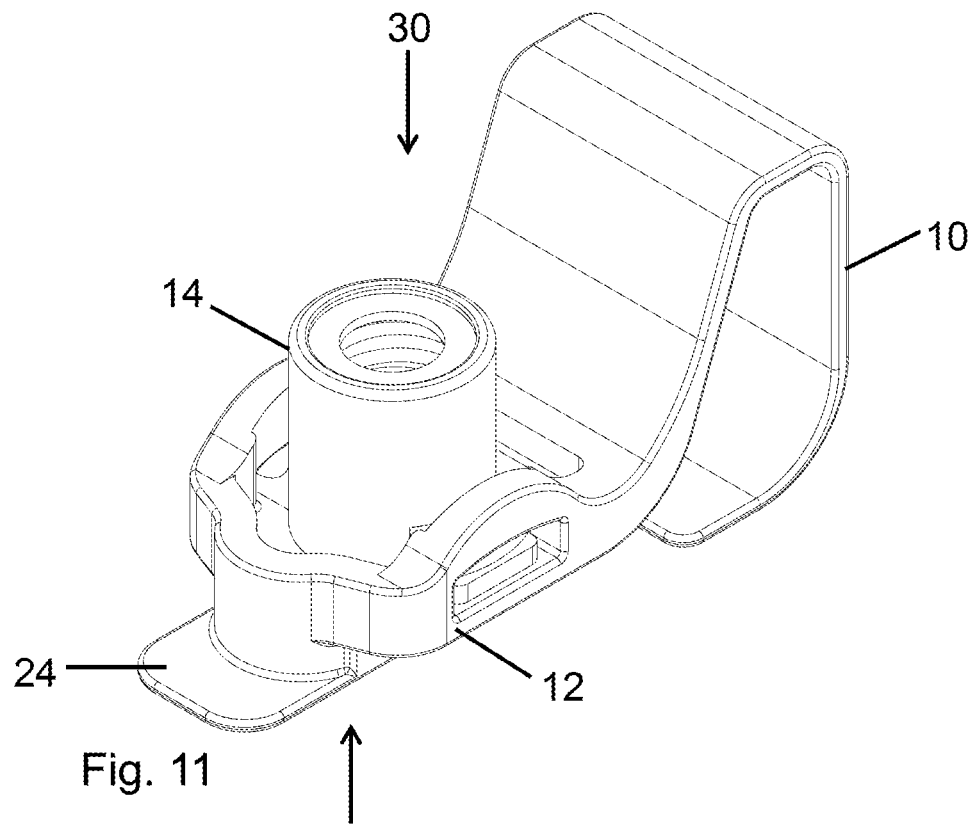
FIG. 11 shows a perspective diagram of a third embodiment of a clip.
Figure 12:
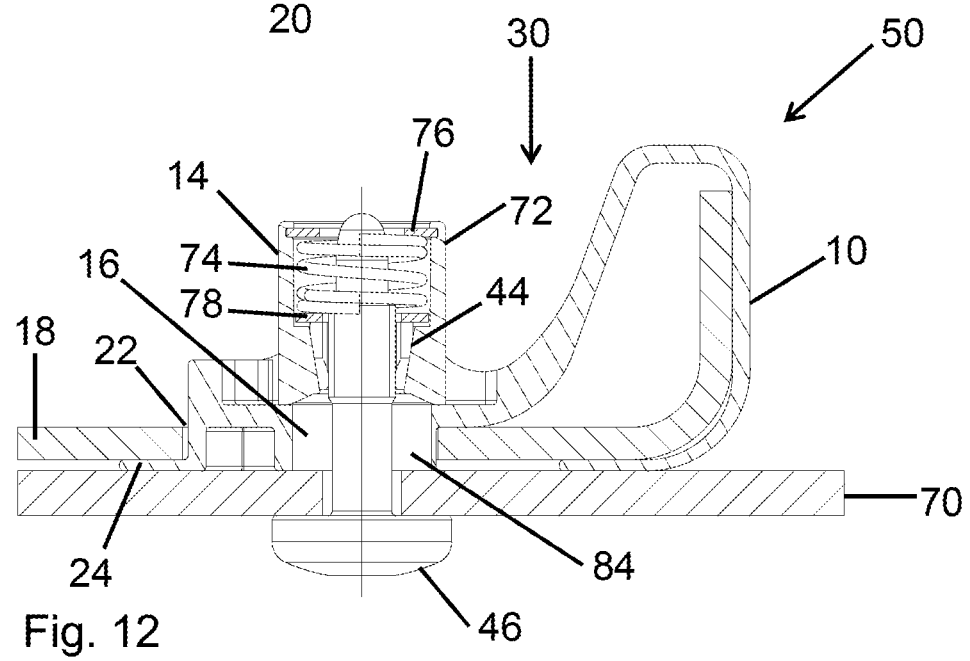
FIG. 12 shows a section through a fastening arrangement having a clip according to FIG. 11.

FIG. 11 shows a perspective diagram of a third embodiment of a clip 30. FIG. 12 shows a section through a fastening arrangement having a clip 30 according to FIG. 11. Again using the example of the same clip body 10 as in FIGS. 7, 8, 9 and 10, a further variant of a clip 30 is shown. This clip 30 has a taper nut 44 as the fastening device 14, which interacts with a screw-fastening 46. The taper nut 44 sits in a housing 72 and is driven by a spring 74, which is tensioned between two panels 76, 78, into a final position in a conical seat in the housing 72. If, starting from this final position, a screw-fastening 46 is pushed into the taper nut 44 (the screw-fastening 46 does not have to be rotated), the taper nut 44 is displaced under the compression of the spring 74. The taper nut 44 is made such that the diameter of its internal thread can increase during this process. The screw-fastening 46 can thus penetrate the taper nut 44. Once the screw-fastening 46 has reached its final position, the threads of the screw-fastening and of the taper nut 44 lie in each other, so that the taper nut 44 can again be arranged completely or virtually completely in its seat inside the housing 72. If one wishes to remove the screw-fastening 46 from the fastening arrangement 50, this can be done by unscrewing.

In another embodiment, it is not necessary to use a nut and a screw-fastening. Rather, an article can be used which is somehow provided with grooves inside, instead of the nut 44. A pin has corresponding grooves. The pin is introduced into the article in an identical manner to that described in connection with the taper nut 44 and the screw-fastening 46. However, it is not possible to move the article out of the fastening arrangement by unscrewing as described in connection with the taper nut 44 and screw-fastening 46.

Figures 13, 14:
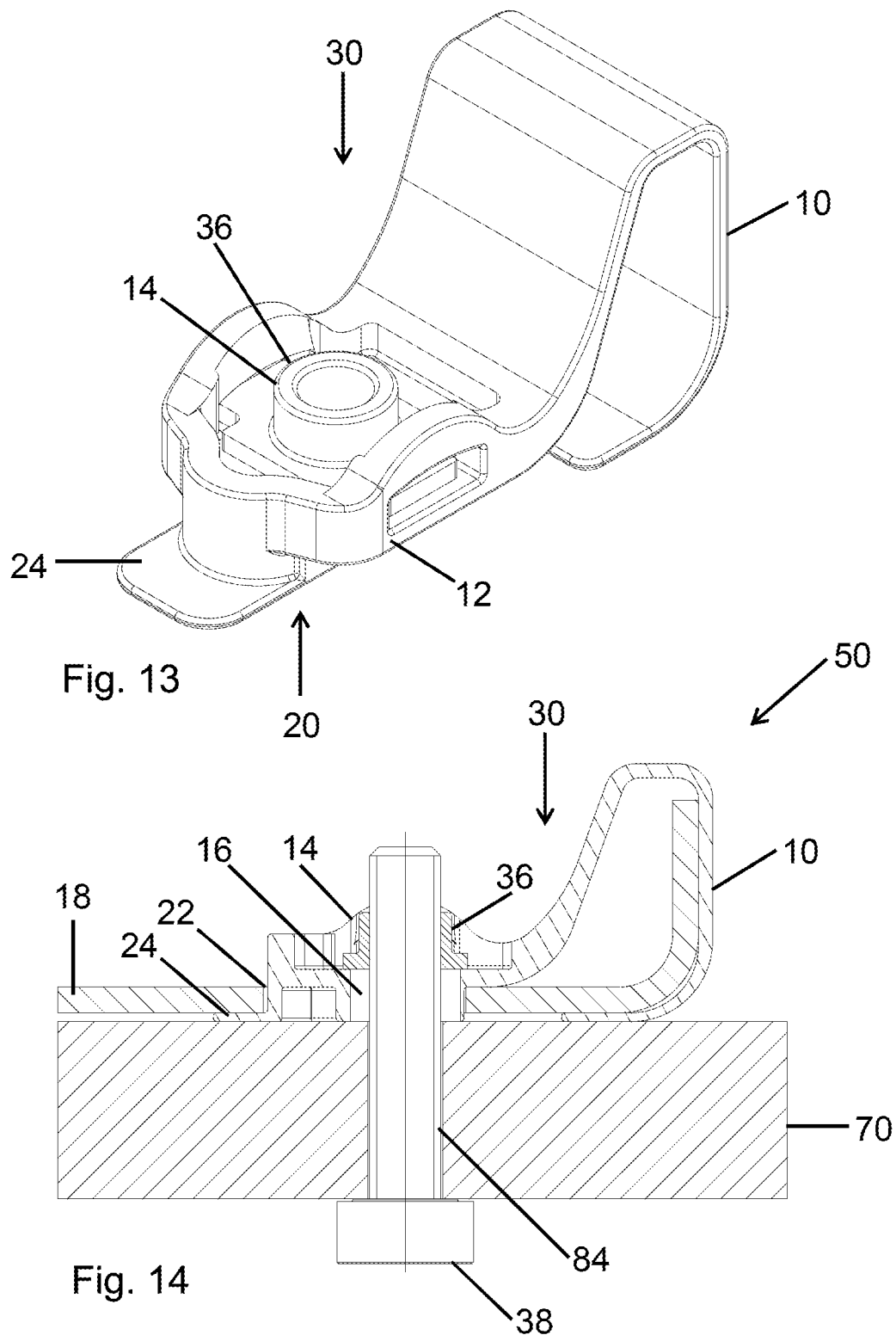
FIG. 13 shows a perspective diagram of a fourth embodiment of a clip.
FIG. 14 shows a section through a fastening arrangement having a clip according to FIG. 13.

FIG. 13 shows a perspective diagram of a fourth embodiment of a clip 30. FIG. 14 shows a section through a fastening arrangement having a clip 30 according to FIG. 13. The clip body 10 is again identical to the clip bodies of the fastening arrangements 50 described in connection with FIGS. 7, 8, 9, 10, 11 and 12. In this case, the fastening device 14 is formed by a nut 36 which interacts with a screw-fastening 38.

Figure 15:
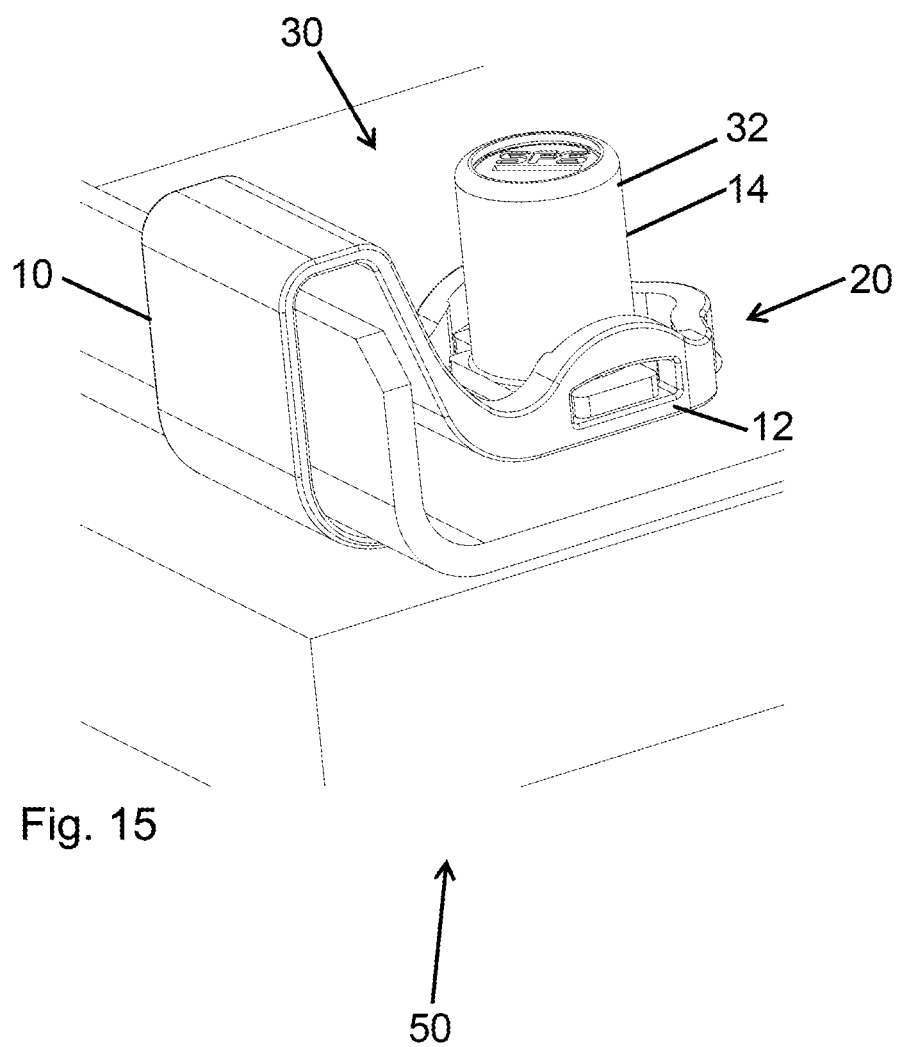
FIG. 15 shows a perspective diagram of a fastening arrangement.

FIG. 15 shows a perspective diagram of a fastening arrangement.

Figure 16:
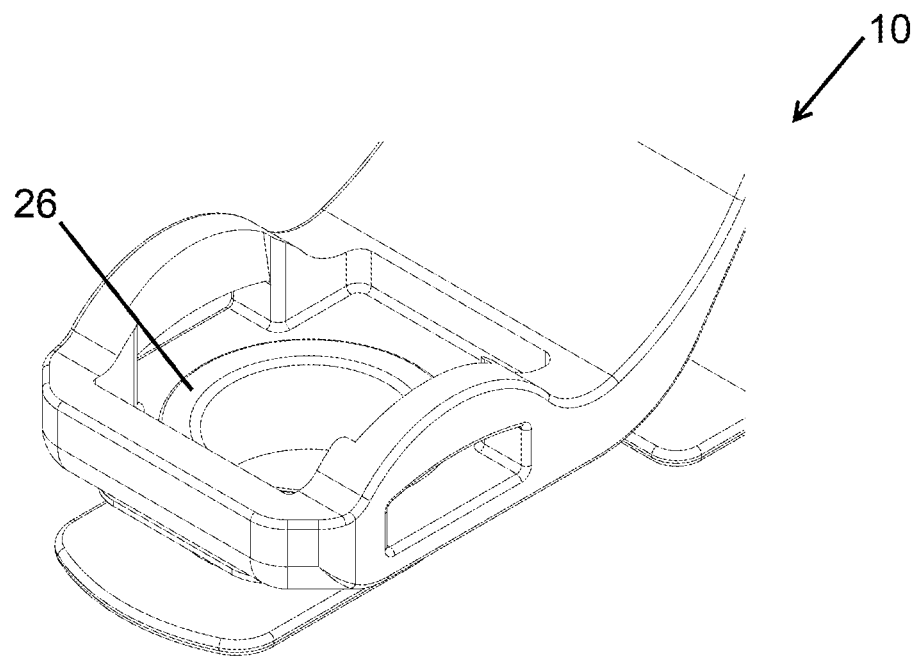
FIG. 16 shows a first partial perspective diagram of a clip body.

FIG. 16 shows a first partial perspective diagram of a clip body 10.

Figure 17:
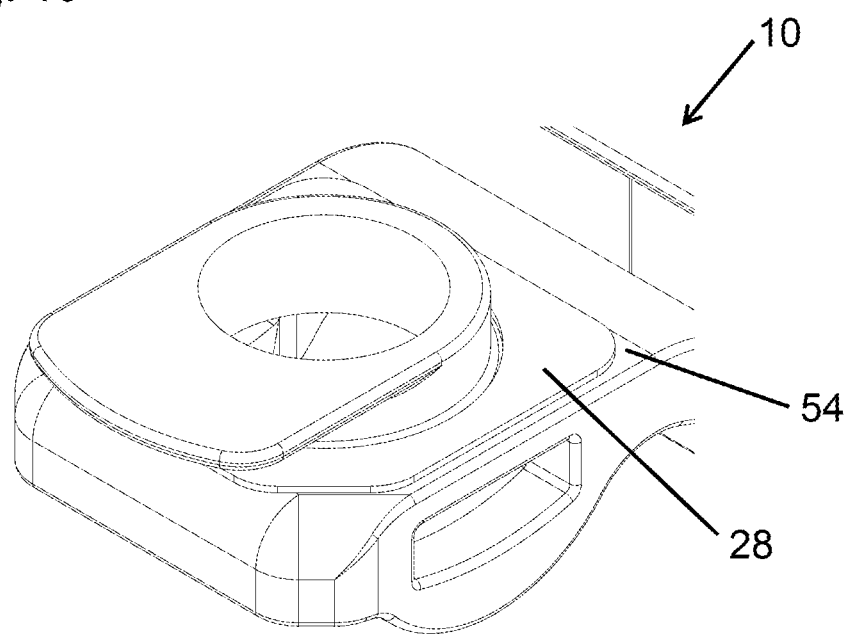
FIG. 17 shows a second partial perspective diagram of a clip body.

FIG. 17 shows a second partial perspective diagram of a clip body 10. A seal 28 is arranged on the contact region 54 of the clip body 10. Therefore, said seal lies on the upper face of the panel (not shown here). It prevents contact corrosion, depending on the materials of the components involved. Furthermore, a region above the fastening arrangement can be separated in a gas-tight and/or liquid-tight manner from a region below the fastening arrangement. A further seal 26 is arranged where the fastening device 14 sits on the clip body 10. This can again prevent contact corrosion. This also helps to seal off the different regions.

The features of the invention disclosed in the above description, in the drawings and in the claims can be essential to the realisation of the invention both individually and in any desired combination.

LIST OF REFERENCE SYMBOLS

10 Clip body
12 Retainer
14 Fastening device
16 Fastening opening
18 Panel
20 Positioning element
22 Edge
24 Tongue
26 Sealing element
28 Sealing element
30 Clip
32 Retaining cam
34 Pin
36 Nut
38 Screw-fastening
40 Spring clip
42 Pin
44 Taper nut
46 Screw-fastening
50 Fastening arrangement
52 Retaining lug
54 Contact region
56 Contact region
58 Contact region
60 Limb
62 Limb
64 Connecting region
66 Tongue
68 Tongue
70 Panel
72 Housing
74 Spring
76 Panel
78 Panel
84 Opening

The invention claimed is:

1. A clip body adapted to be fastened to a panel provided with at least one fastening opening, the clip body comprising a retainer for a fastening element and two limbs, of which one is adapted to be arranged on a first side of the panel and the other is adapted to be arranged on a second side of the panel, and for this purpose is placed onto an edge of the panel, at least one positioning element on one of the limbs, the at least one positioning element is adapted to be guided through the fastening opening in the panel and includes a stop, and the clip body is adapted to be positioned on the panel by the stop of the positioning element contacting an edge of the fastening opening, and the positioning element simultaneously acts as a locking element for stabilisation in an axial direction and has at least one tongue extending therefrom that is adapted to be inserted through the fastening opening in the panel to an opposite side of the panel from the one of the limbs from which the positioning element extends.

2. The clip body according to claim 1, further comprising at least one reinforcement element.

3. The clip body according to claim 1, wherein the clip body is produced from at least one of an insulating material or a material which prevents contact corrosion.

4. The clip body according to claim 1, wherein the clip body is formed of plastic.

5. The clip body according to claim 1, further comprising at least one sealing element attached thereto.

6. A clip comprising a clip body according to claim 1 and a fastening device.

7. The clip according to claim 6, wherein the fastening device is at least partially bolt-shaped.

8. The clip according to claim 6, wherein the fastening device comprises a holding cam and a pin.

9. The clip according to claim 6, wherein the fastening device comprises a nut and a screw-fastener.

10. The clip according to claim 6, wherein the fastening device comprises a spring clip and a pin.

11. The clip according to claim 6, wherein the fastening device comprises a taper nut and a screw-fastener.

12. The clip according to claim 6, wherein the fastening device is held in the retainer with play in at least one direction that is adapted to be parallel to the panel.

13. A fastening arrangement comprising the clip according to claim 6 and a panel provided with a fastening opening, wherein the panel is arranged in an interior of a vehicle or aircraft.

* * * * *